United States Patent
Ko

(10) Patent No.: US 8,526,330 B2
(45) Date of Patent: Sep. 3, 2013

(54) AUTOMATIC-SWITCHABLE NETWORK EXTENSION APPARATUS AND A SWITCHING METHOD

(75) Inventor: Jen-Chang Ko, Taipei County (TW)

(73) Assignee: Etherwan Systems, Inc., Taipei County (TW)

( * ) Notice: Subject to any disclaimer, the term of this patent is extended or adjusted under 35 U.S.C. 154(b) by 307 days.

(21) Appl. No.: 12/944,932

(22) Filed: Nov. 12, 2010

(65) Prior Publication Data

US 2012/0120948 A1 May 17, 2012

(51) Int. Cl.
*H04L 12/28* (2006.01)
*G06F 15/16* (2006.01)

(52) U.S. Cl.
USPC .......................................... 370/254; 709/209

(58) Field of Classification Search
None
See application file for complete search history.

(56) References Cited

U.S. PATENT DOCUMENTS

| | | | | |
|---|---|---|---|---|
| 5,960,036 A | * | 9/1999 | Johnson et al. | 370/278 |
| 6,888,884 B2 | * | 5/2005 | Benayoun et al. | 370/468 |
| 2002/0141553 A1 | * | 10/2002 | Kurihara et al. | 379/133 |
| 2004/0052263 A1 | * | 3/2004 | Xu | 370/399 |
| 2005/0071800 A1 | * | 3/2005 | Liu | 716/18 |
| 2005/0111534 A1 | * | 5/2005 | Rapaport | 375/222 |
| 2005/0213648 A1 | * | 9/2005 | Chow | 375/222 |
| 2005/0271153 A1 | * | 12/2005 | Okamura et al. | 375/260 |
| 2008/0165950 A1 | * | 7/2008 | Chang | 379/399.01 |

FOREIGN PATENT DOCUMENTS

TW 332347 I 7/2008

* cited by examiner

*Primary Examiner* — Timothy J Weidner
(74) *Attorney, Agent, or Firm* — Rosenberg, Klein & Lee

(57) ABSTRACT

Disclosed herein are an automatically-switchable network extension apparatus and a switching method thereof. An automatic connection mechanism is particularly introduced into the apparatus. Exemplarily, a random number scheme is used to generate a value to be a basis for configuring the apparatus functioned as a CO or CPE operational mode. Based on the value, the method is to perform a connection with the other network extension apparatus. According to the embodiment, a set of connection parameters and the randomly-generated value are generated after the apparatus is initialized. The apparatus may be configured as CO or CPE operational mode according to the value, and simultaneously detect the operational mode of the apparatus to be linked. The apparatus accomplishes the connection if the two apparatuses have different modes, or the value is generated again to perform the connection.

7 Claims, 6 Drawing Sheets

AUTOMATIC-SWITCHABLE NETWORK EXTENSION APPARATUS AND A SWITCHING METHOD

BACKGROUND OF THE INVENTION

1. Field of the Invention

The instant disclosure relates to an automatically-switchable network extension apparatus and a switching method therefor, more particular to a network extension apparatus performing an automatic switching according to the operational mode of the other network extension apparatus.

2. Description of Related Art

FIG. 1 shows a conventional architecture of VDSL system. The system has a CPE (Customers Premises Equipment) end X and a CO (Center Office) end Y. The CPE end X is such as a home subscriber of a telecommunication service, and the CO end Y is preferably a telecommunication company. In which, the connection is made by two different network devices respectively installed at the CPE (X) and CO (Y) ends. For example, the CPE-end transmitting device 11 and the CO-end transmitting device 12 are connected via a copper wire 101. This wire 101 is simultaneously carrying voice signal and data.

FIG. 1 shows an implementation of a VDSL system. The CPE-end transmitting device 11 operates as a signal splitter, which is used to split the data and voice signal over the copper wire 101. In practice, the splitter is functioned to filter the high and low-frequency signals with the data and voice. The CPE-end transmitting device 11 particularly filters out the voice signals and transmits the signals to its linked home telephone 13. On the other hand, the voice signals can be transmitted to the CO end via the CPE-end transmitting device 11 from the telephone 13.

Furthermore in the present example, the CPE-end transmitting device 11 transmits the data to an ADSL Transceiver Unit Remote (ATU-R) 14. The data then undergoes an analog-to-digital conversion and demodulation, and serves the user-end computer 15 via network. User may use the computer 15 to transmit the data to the CPE-end transmitting device 11 via the ADSL Transceiver Unit Remote 14. The data is then transmitted to CO-end device. The splitting means performed by the CPE-end transmitting device 11 carries and receives both voice signal and data by carrier wave, the voice signal and data are split up into different applications.

Center office employs the CO-end transmitting device 12 to link with the CPE-end transmitting device 11. This device 12 is also functioned to perform the splitting in order to split the CPE end voice and data. The voice signal is transmitted over PSTN (public switched telephone network) 18 via a voice PBX 16. On the other hand, the split data is transmitted to a DSLAM (DSL access multiplexer) 17. This DSLAM 17 effectively integrates the IP network and an ATM network 19. At last, the data is transmitted to the network service provider (ISP) 191 or an enterprise 193.

Similarly, the splitting function performed by the CPE-end transmitting device 11 or the CO-end transmitting device 12 also combines the voice and data, or splits them after receiving.

In the VDSL system, the CPE end and CO end respectively employs different transmitters (11, 12) with different splitting schemes. The CPE end device and the CO end device are connected via the copper wire 101. It is noted that the VDSL system preferably requires installing the CO-end transmitting device as a master, and the CPE-end transmitting device as a slave.

SUMMARY OF THE INVENTION

In addition to take advantage of the conventional VDSL scheme, a hybrid filtering or signaling means is particularly used to integrate the CO-end and CPE-end transmitting devices into a single device. An automatic connection mechanism is further introduced to automatically switch the operational modes, for example, it is to switch the CO end as a master mode or the CPE end as a slave mode.

Since the CPE-end device and the CO-end transmitting device conduct different signaling schemes, two different types of circuits therefor are needed for integration. An integrated signal processing chip is disclosed in the instant disclosure. The chip is particularly used to integrate the functions including signal processing, CO end filtering and CPE end filtering. The chip may be in cooperation with a CO/CPE circuit switching unit. Therefore, the single device may perform the transmission for CO end or CPE end by the circuit switching unit. It is featured that the automatic connection process may fast and conveniently achieve the connection a remote device. No any person is needed to reach the site to conduct the configuration, for example, configuration for CO or CPE.

To implement the CO and CPE splitting in single device, one of the embodiments incorporates an integrated chip into an automatically-switchable network extension apparatus. The apparatus provides at least two input/output ports through a communication-port connecting unit. This unit also links with a manual or automatic function switching mechanism. The mechanism is such as an automatic switching unit and a switch. The apparatus is also equipped with a display unit, such as light or display, indicating the current operation status.

One further embodiment is to integrate the electrically-connected data processing unit, a hybrid CO/CPE control unit, a D/A output unit, a communication-port connecting unit having RJ-45 and RJ-11 interfaces, an automatic switching unit performing automatic linking process, a status displaying unit showing the operational mode, and a communication-port controller for network detection. Further, a hardware-implemented CO/Auto/CPE switch can be included.

The data processing unit is in charge of executing the transmission of signals. The CO/CPE circuit switching unit performs switching the CO-end and CPE-end circuits. The D/A output unit performs signals filtering or/and digital-analog conversion. The communication-port connecting unit provides some types of communication ports for the apparatus. The ports are respectively used to connect to a network and the other network extension apparatus. The status displaying unit is implemented as status lights or a display for indicating the operation mode.

It is also noted that the apparatus has an inside installed automatic switching unit for generating a switching signal by manual or automatic method in order to execute further connection process. The switching unit is to switch the apparatus as a CO or CPE operational mode.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The network extension apparatus of the instant disclosure is applicable to one single device with switchable CO-end and CPE-end circuits. The network extension apparatus is particularly bridged between two devices. The apparatus has at least two connection ports.

The embodiment is, but not limited to, is to bridge an Ethernet-based LAN and PSTN-based WAN.

The major feature of the network extension apparatus is to integrate the CPE and CO circuits into one single device, and more particularly to introduce an automatic switching mechanism to the apparatus. The mechanism is preferably implemented as a switch configured to conduct switching. Alternatively, automatic switching function can be a default configuration which is functioned without any physical switch. In one further embodiment, a chipset is used to implement the automatic switching. For example, an instruction conducted by the chipset enables an automatic connecting process according to an automatic switching instruction or switching signal. Furthermore, this chipset preferably performs an initializing operation for the CPE end or the CO end in order to implement switching.

Figure 1:
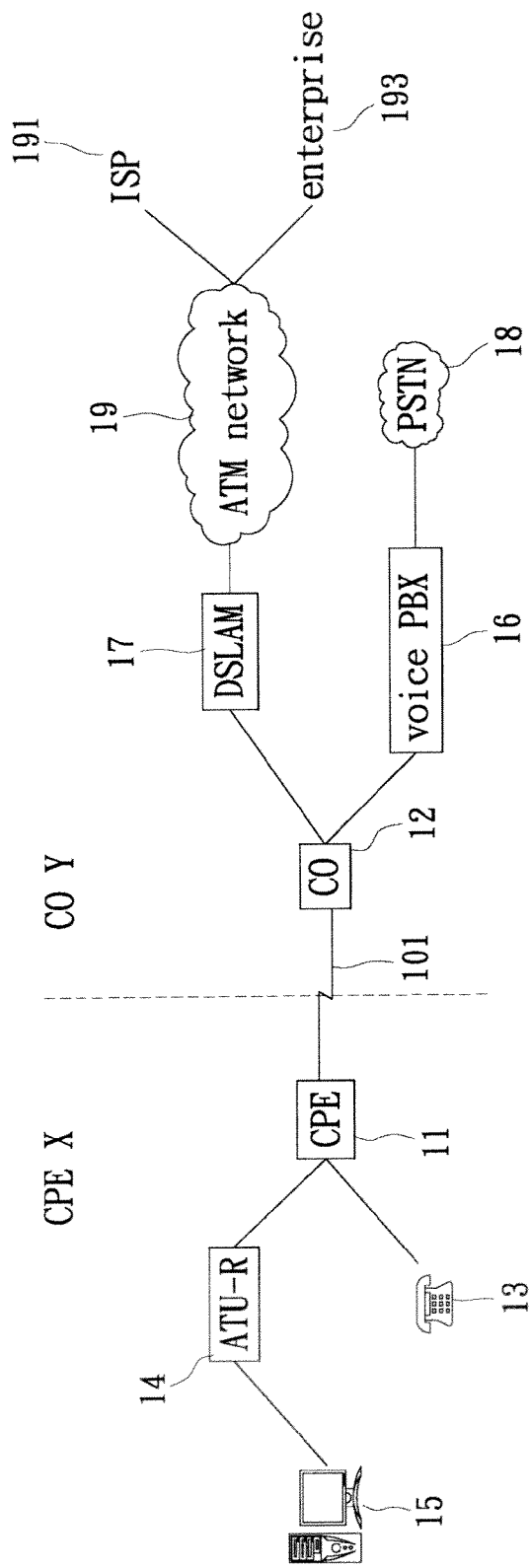
FIG. 1 shows an architecture of a conventional VDSL system.
Figure 2:
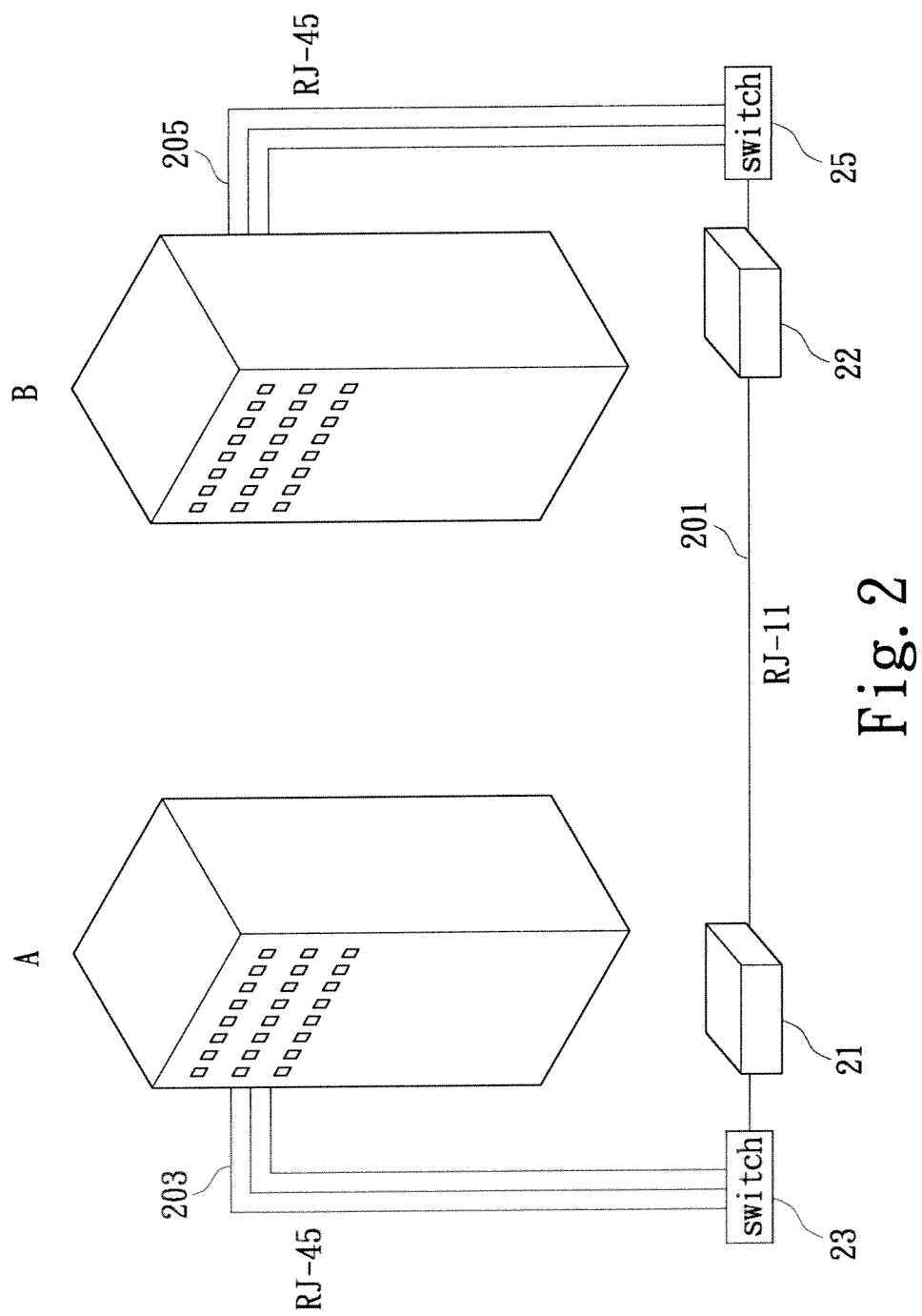
FIG. 2 shows a schematic diagram of the apparatus disposed between buildings in accordance with the present invention.

Reference is made to FIG. 2. Two buildings A and B are shown in the diagram and representing two different local area networks. Users may use network cable, such as RJ-45, 203 to link with the switches or routers 23, 25 of the LAN, and thereby to link with an external network. In the instant example, the building A and the building B respectively have a first network extension apparatus 21 and a second network extension apparatus 22. These two network extension apparatuses respectively link to two LANs via a line 201. The line 201 can be implemented by an RJ-11 connection which often has characteristics of long-distance transmission. RJ-11 usually provides an effective 30 Mbps transmission rate over 600 m copper wire, but not be limited to Ethernet with 100 m limitation.

The above described first network extension apparatus 21 and the second network extension apparatus 22 can be functioned to be a CO-end or CPE-end role and formed as a peer-to-peer network structure. However, these two network extension apparatuses can be manually configured to have its circuit and filtering or signaling means at an initial step. If one apparatus plays as CO-end network extension apparatus, the other one may play as CPE-end network extension apparatus. The line 201 is used to bridge these two apparatuses and exchange their network packets.

The LAN of building A and the LAN of building B are interconnected to form one LAN by a wired or wireless connecting means since Ethernet network ports mounted on the described network extension apparatuses 21, 22 are linked via a switch or other network-able device such as a router or a hub.

Figure 3A:
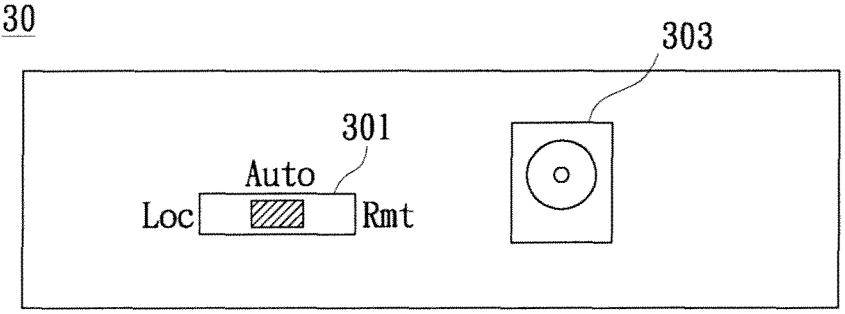
FIG. 3A to FIG. 3C shows a schematic diagram of a panel of the network extension apparatus in accordance with the present invention.
Figure 3B:
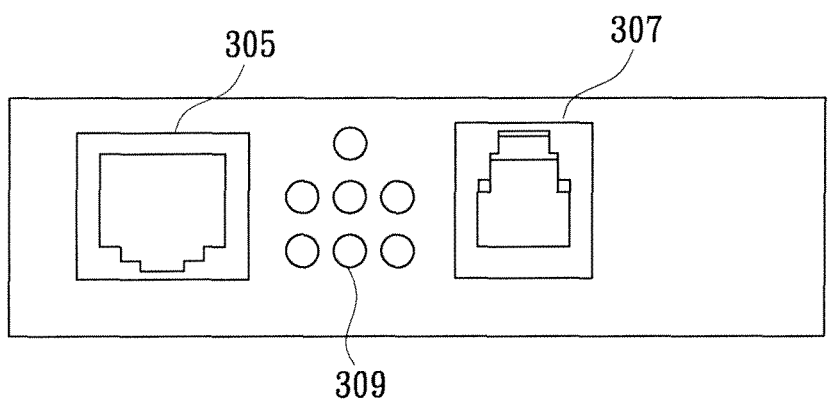
Figure 3C:
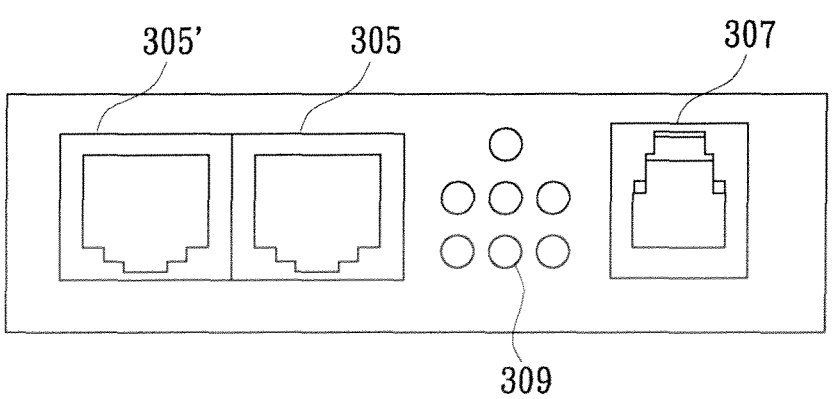

Further references are made to FIG. 3A to FIG. 3C, which show the schematic diagram of a panel of the network extension apparatus. The panel is installed with some connection ports, a switch and status lights.

FIG. 3A shows one lateral side of the network extension apparatus 30. A select switch 301 and a power outlet 303 for connecting to a power supply are mounted on the panel. Users may use the select switch 301 to make a selection. In the current embodiment, the selections may be the shown "Loc", "Rmt" or "Auto". When "Loc" is selected manually, the switching circuit is conducted to switch the apparatus as a CO-end network extension apparatus; if "Rmt" is selected, the apparatus is switched to CPE-end network extension apparatus. In particular, if "Auto" is selected, the apparatus is functioned to perform the automatic connecting process for automatically switching the operational role of the apparatus. That means, when the network extension apparatus 30 at the other end is detected as the CO-end device, the automatic switching process can configure the apparatus to be the CPE-end device. On the contrary, if the other end is the CPE-end device, the apparatus is switched to the CO-end device.

Other than the way to configure the control circuit in the apparatus to be the CO mode or CPE mode, or the switch shown in FIG. 3A selected to switch the operational mode manually or automatically, a fully-automatic switching mechanism without any switch is also applicable. In this embodiment, only lighting signal or display is used to indicate the current operational mode since the fully-automatic switching is employed.

Figure 6:
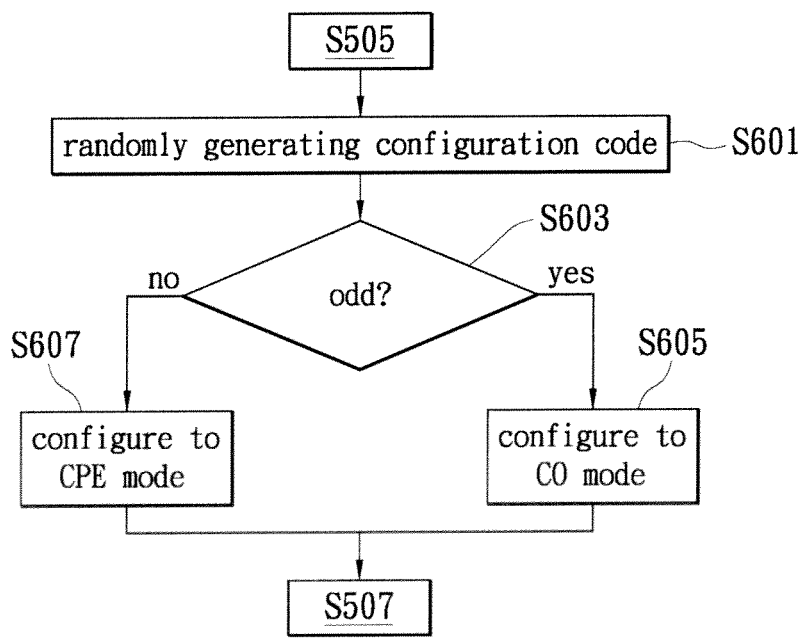
FIG. 6 is the other one flow illustrating the automatic connection procedure in accordance with the present invention.

In the embodiment of automatic switching, both network extension apparatuses at two ends are configured to be "Auto" mode. In general, if there is no other type of device in the network, one (30) of network extension apparatuses may be configured to be CO mode or CPE mode automatically. For example, a random number mechanism may be introduced to decide the operational mode, such as the operational flow illustrated in FIG. 6. While one network extension apparatus is configured to one of the modes, the other apparatus will be set as the other operational mode since it recognizes there is a CO or CPE end device existed.

The mentioned network extension apparatus is generally used to bridge a LAN with another network. The panel provides a plurality of communication ports is such as the embodiment shown in FIG. 3B. An Ethernet network port 305 with RJ-45 format, a telephone line port 307 with RJ-11 format, and any format in compliance with the packet-collision network type are, but not limited to, disposed. In an example, the Ethernet network port 305 is preferably disposed to a router, switch or hub, and the port is conducted to link with an internal network. The telephone line port 307 is the port linked with the telephone line port of the other network extension apparatus 30. Exemplarily, FIG. 2 shows the connections, which link with two or more LANs.

The panel of network extension apparatus 30 is equipped with a status display light 309 having a plurality of lighting signals, such as LED and display. The status display light 309 can be used to indicate the network status, operation of the apparatus, the status of power supply, and also to show the operational mode of the network extension apparatus. The network extension apparatus uses the lighting signal or display to indicate its CO or CPE mode.

In one further embodiment, the panel shown in FIG. 3C includes at least one telephone line port 307 and two or more Ethernet network ports 305, 305'. This apparatus may be used to be a network switch. Through telephone line port 307, users may link to other network(s) extended by the network extension apparatus 30. Through the plurality of Ethernet network ports (305, 305'), more internal network devices are linked. The status display light 309 is capable of indicating the statuses of network connection, operation, power supply and operational mode.

Figure 4A:
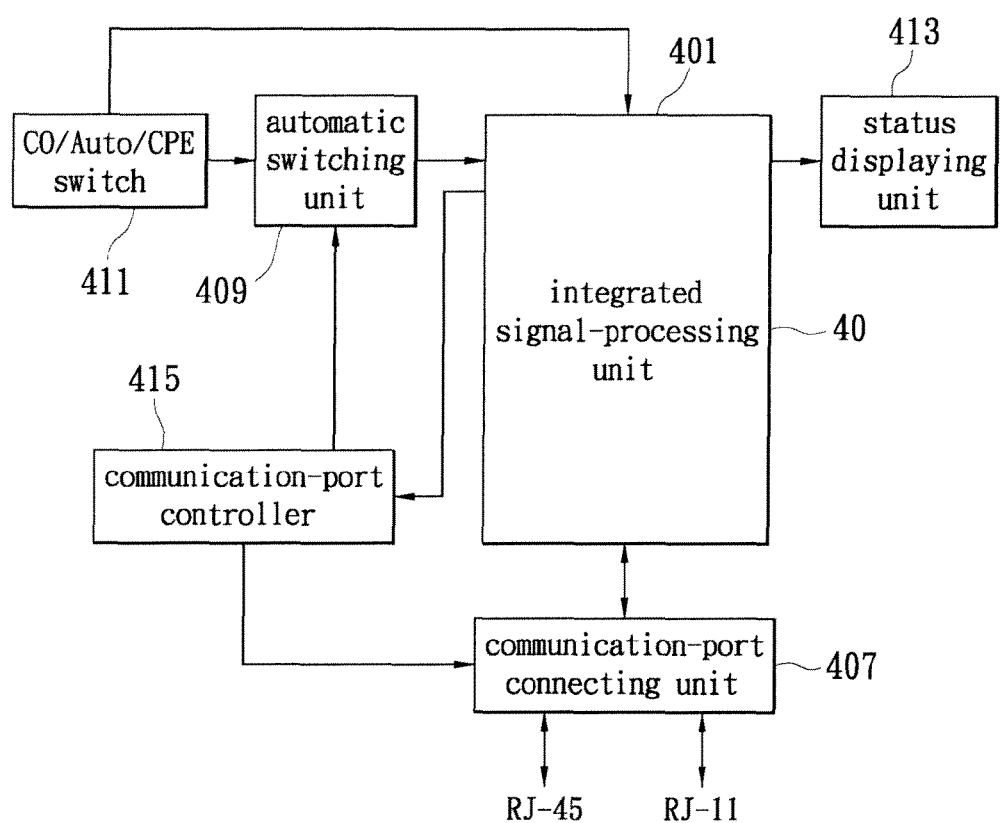
FIG. 4A depicts an electric b (selections of Loc, Rmt and Auto) Lock diagram of one of the embodiments of the extension apparatus of the present invention.

A control circuit, such as a control IC, is mainly used to implement the above described switch based on a switching signal. The switching signal is conducted to switch the circuit of the CO end and the CPE end. The related embodiment can be referred to FIG. 4A.

For implementing a single device capable of splitting the signals for CO and CPE modes, according to the diagram, an integrated signal-processing unit 40 is particularly disposed in the apparatus. The IC may integrate the signaling process and the filtering process between the CO and CPE circuits into one device, including the integration of input/output packets and the signals among the units in the apparatus. Therefore, the filtering scheme in the IC may process the signals between the CO-end circuit and CPE-end circuit.

A configuration is generated by the network extension apparatus through the automatic switching unit 409. An automatic connecting process is then performed. The configuration may be generated automatically according to the detected operational mode of the other network extension apparatus, or alternatively be generated by manual switching. The hardware-implemented CO/Auto/CPE switch 411 is particularly introduced.

According to the configuration, the network extension apparatus operates under the CO operational mode or the CPE operational mode. The network extension apparatus provides a communication-port connecting unit 407 with several ports including RJ-45 and RJ-11. By which, the network extension apparatus can link with the other network extension apparatus and other network.

The integrated signal-processing unit 40 is used to process the signals among the circuit units in the automatically-switchable network extension apparatus. The integrated signal-processing unit 40 is electrically connected to the automatic switching unit 409. The integrated signal-processing unit 40 is used to process the signals under the CO or CPE mode and to the other network extension apparatus according to the configuration. The communication-port controller 415 is used to detect the operational mode of the other network extension apparatus according to a handshaking process. The status displaying unit 413 is further employed to indicate the operational mode for each apparatus.

Figure 4B:
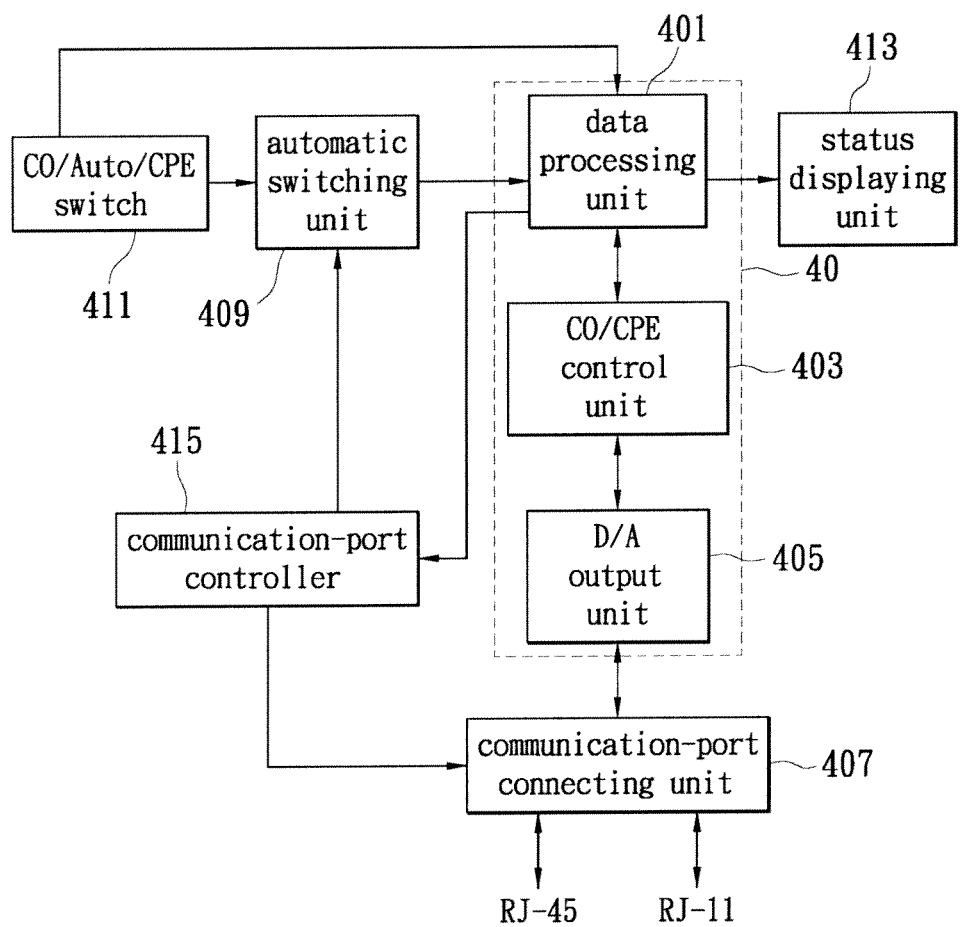
FIG. 4B depicts an electric b (selections of Loc, Rmt and Auto) Lock diagram of the other one of the embodiments of the extension apparatus of the present invention.

One further embodiment is schematically shown in FIG. 4B. The network extension apparatus incorporates an automatic switching signal to conduct a hybrid filter to process the signals as switching the circuit.

The network extension apparatus includes the circuit units described in FIG. 4B. Rather than the signal processing and filtering integrated into the integrated signal-processing unit 40 shown in FIG. 4A, the mutually connected data processing unit 401, hybrid CO/CPE control unit 403 and D/A output unit 405 are employed in the current embodiment. The apparatus particularly provides input and output ports such as RJ-45 and RJ-11 through the communication-port connecting unit 407. The apparatus further includes an automatic switching unit 409 for performing the automatic connecting process and a communication-port controller 415 in charge of network detection. The apparatus optionally includes a hardware-implemented CO/Auto/CPE switch 411 and a status displaying unit 413 for indicating the operational mode.

The network extension apparatus employs the data processing unit 401 to process the signals among the units, especially the switching signal for performing the switching of operational modes. The CO/CPE circuit switching unit 403 therein is used to perform the switching of circuit for CO mode or CPE mode. The status displaying unit 413 serves to control the light or display for indicating the operational status. The apparatus may detect the operational mode of the other apparatus by the signals as in handshaking process via the communication-port controller 415.

The CO/CPE circuit switching unit 403 is used to switch the circuits. For example, the switching may be implemented by a circuit or a control IC. The unit 403 performs the signaling and digital-analog conversion by the D/A output unit 405. The D/A output unit 405 is electrically connected to the data processing unit 401, and is one of the major circuits used to implement the single device capable of conducting CO and CPE modes. According to the switching signal generated by the CO/CPE circuit switching unit 403, the various signaling functions or digital-analog conversion are performed. The CO/CPE circuit switching unit 403 can be implemented by circuit or a chip.

The mentioned data processing unit 401, CO/CPE control unit 403 and D/A output unit 405 are formed a control circuit in an example, or a chip in another embodiment.

The D/A output unit 405 is connected to the communication-port connecting unit 407 with some ports including RJ-45 and RJ-11. When the data processing unit 401 generates signal to control the CO/CPE control unit 403 for circuit switching. The signals filtered by the D/A output unit 405 are transmitted to the communication-port connecting unit 407, and outputted via the communication ports. On the other hand, the input signals are also filtered and sent to the data processing unit 401. After that, the signals are outputted through the signaling process.

The communication-port connecting unit 407 uses the telephone line port (RJ-11) to link to external network or the device located at the other end, such as the CO end or CPE end. The Ethernet network port (RJ-45) is the linked port in this example.

The D/A output unit 405 transmits or receives the signals via the communication-port connecting unit 407. One of the ports of the network extension apparatus corresponds to the port of the other network extension apparatus. Since the local apparatus is switched to a CO mode network extension apparatus, the apparatus at the other site should be a CPE mode network extension apparatus, and vice versa. An automatic connecting process is introduced to implement the connection there-between.

In particular, the apparatus includes the automatic switching unit 409 which is used to execute the automatic connecting process. The automatic switching unit 409 can be pre-determined as an automatic switching mode, or determines if the automatic connecting process is performed according to the switching signal generated by the CO/Auto/CPE switch

411. The CO/Auto/CPE switch 411 is a selection circuit which provides selections of manual switching and automatic switching. Since the automatic switching unit 409 receives the automatic switching signal generated by the switch 411, the automatic connection is conducted. The switch 411 may be switched manually to the CO mode or the CPE mode, and the generated signal is then transmitted to the data processing unit 401. The data processing unit 401 may control the circuits 403, 405 to perform the circuit switching and digital-analog conversion or other like signaling process.

A communication-port controller 415, electrically connected to the automatic switching unit 409 and the data processing unit 401, is further introduced to conduct the network detection. Based on the automatic connecting process, the data processing unit 401 detects if any other network extension apparatus exists through the communication-port controller 415. The apparatus then tries to make a connection to the detected apparatus based on the configuration made by the automatic switching unit 409. The related information regarding to the connection may be delivered to the automatic switching unit 409.

The status displaying unit 413 used to display the operational mode electrically connects to the data processing unit 401, and retrieves the information. The status displaying unit 413 particularly may display the operational status by some lighting signals. The status may be the selected CO mode or CPE mode, the status of current connection, normal or abnormal operation of the whole apparatus, or/and the status of power supply. The status displaying unit 413 can be implemented by twinkling or changing colors of LEDs, or using display to show the operational status for users.

Figure 5:
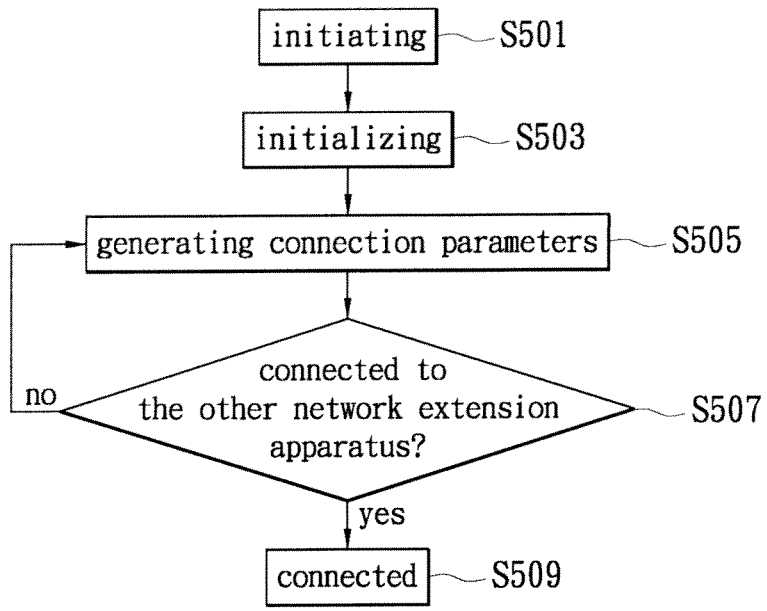
FIG. 5 is one of the flows illustrating the automatic connection procedure in accordance with the present invention.

The automatic connecting process for the automatically-switchable network extension apparatus in the disclosure may be referred to the flow illustrated in FIG. 5.

In the beginning of the steps, the automatically-switchable network extension apparatus is initiated (step S501). The next step is to initialize the circuits of the network extension apparatus (step S503), in which, the step is to drive the internal elements and activate the communication ports. The mentioned automatic switching unit 409 then generates a set of connection parameters, including the configuration parameters for any necessary protocols and the configuration code for configuring the operational modes (step S505). This configuration code is used to define the apparatus' operational mode, that is CO mode or CPE mode. Accordingly, the corresponding circuit is then switched.

After that, the communication-port controller 415 issues packets over network via a communication port in order to detect if there is any initiated network extension apparatus and its operational mode. In one embodiment, the other network extension apparatus may issue the packets for detection. The communication-port controller 415 at one end may receive the packets and detect the operational mode. In step S507, as a result of the detection, the automatic connecting process is initiated to determine whether or not the network extension apparatuses at two separate ends can be linked with each other based on the detected modes.

If the link is not yet done, such as the step S505, the process is to generate the connection parameters continuously. The parameter, such as the configuration code, is used to configure the operational mode. The process goes on determine if the link can be done. In step S509, the link can be done since the parameters are matched with each other.

During the above described automatic connecting process, the step S505 to step S507 can be repeated until the two apparatuses are linked. After the well communication, the process may still periodically confirm the connection, the automatic connecting process may be activated again if it is necessary. The further embodiment is made to the flow illustrated in FIG. 6.

In the step S505, the connection parameters, including the configuration code, are generated. The configuration code can be generated automatically with several schemes. One of the embodiments to generate the configuration code is to employ the mentioned switch. By the switch, depending on user's selection, the configuration code can be generated manually or automatically.

The other one embodiment to generate the configuration code employs an even/odd scheme. In which, the number 0 or 1 is preferably generated in sequence, and the number is served to decide the configuration code referred to configure the operational mode of the network extension apparatus.

In one further embodiment, a random number generator (not shown in the diagram, preferably implemented in the data processing unit) is particularly introduced. The configuration code is the value generated by referring to a random number generated by the random number generator (step S601). Therefore, the value can be an odd number or an even number. The apparatus is configured to be one operational mode based on the odd or even value.

In the current embodiment, the step S603 is to determine whether the value is odd. If the value is odd, the method goes to step S605, the automatic switching unit 409 generates a signal to the data processing unit 401 for configuring the control circuit of the apparatus to be a CO mode; if the value is not odd but even, such as step S607, the data processing unit 401 configures the control circuit as a CPE mode according to the signal sent by the automatic switching unit 409. It is noted that, the odd number or even number related to specify the configuration can be exchanged.

After the configuration related to CO mode or CPE mode has been done, the method goes to step S507 to conduct the automatic connecting process and then determine if the link with the other network extension apparatus is done. Since the link between the network extension apparatuses at two ends are required to complied with a master-slave matching, one end needs to be a master (exemplarily CO mode) and the other end needs to be a slave (exemplarily CPE mode).

The configuration code is the reference made to configure the CO mode or CPE mode. After the determination of step S507, the two network extension apparatuses are in process of handshaking, and exchanging the required connection parameters. However, if the two ends are simultaneously configured to be the same operational mode, the process will repeat the above described steps, such as to generate the random number (step S601) again to configure the operational mode, and to process the step S605 or S607. If the two ends have different operational modes, the exchanged connection parameters are used to conduct the connection. Next, the method goes to step S509 of FIG. 5 to process the matching.

To sum up the above description, the major feature of the automatically-switchable network extension apparatus is to conduct the automatic connecting process by automatically configuring its operational mode in order to implement the connection. Therefore, the disclosure discloses an effort-saving and convenient way to establish the connection between the two network extension apparatuses and easily extend the networks over the existed telephone line.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An automatically-switchable network extension apparatus, comprising:
   an automatic switching unit, used to generate a configuration, which is a value generated by a random number generator, to execute an automatic connecting process, and to set the automatically-switchable network extension apparatus to be a CO (Center Office) operational mode or a CPE (Customers Premises Equipment) operational mode according to the configuration;
   a communication-port connecting unit, including a plurality of communication ports, used to connect with other network extension apparatus and a network;
   an integrated signal-processing unit, electrically connected to the automatic switching unit and the communication-port connecting unit, used to process signals in the automatically-switchable network extension apparatus and to process signals with the other network extension apparatus with the CO operational mode or the CPE operational mode according to setting by the automatic switching unit;
   a communication-port controller, electrically connected with the integrated signal-processing unit and the automatic switching unit, used to detect the other network extension apparatus is to be the CO operational mode or the CPE operational mode.

2. The apparatus of claim 1, further comprising a status displaying unit which is used to display status of operational mode of the automatically-switchable network extension apparatus.

3. The apparatus of claim 1, further comprising a hardware-implemented CO/Auto/CPE switch.

4. The apparatus of claim 3, wherein the CO/Auto/CPE switch is electrically connected with the automatic switching unit and the automatic switching unit determines whether or not the automatic connecting process is executed according to a signal generated by the CO/Auto/CPE switch.

5. The apparatus of claim 1, wherein the communication-port connecting unit includes at least a telephone line port and an Ethernet network port.

6. The apparatus of claim 1, wherein the automatically-switchable network extension apparatus further includes a panel, and the panel includes:
   a select switch, having selections of Loc, Rmt and Auto;
   at least one Ethernet network port, used to connect with the network;
   a telephone line port, thereby to link with the other network extension apparatus; and
   a status display light, used to display status of operational mode of the automatically-switchable network extension apparatus.

7. The apparatus of claim 6, wherein if the select switch switches to Loc, the automatically-switchable network extension apparatus is switched to the CO operational mode; if the select switch switches to Rmt, the automatically-switchable network extension apparatus is switched to the CPE operational mode.

* * * * *